(12) United States Patent
Ohtsuji et al.

(10) Patent No.: US 6,607,315 B2
(45) Date of Patent: Aug. 19, 2003

(54) IMAGE PROCESSING SYSTEM HAVING IMAGE FORMING APPARATUS AND PRINTER APPARATUS

(75) Inventors: Shinya Ohtsuji, Tokai-mura (JP); Toshiaki Nakamura, Hitachinaka (JP)

(73) Assignees: Hitachi, Ltd., Tokyo (JP); Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 10/195,372

(22) Filed: Jul. 16, 2002

(65) Prior Publication Data
US 2002/0181988 A1 Dec. 5, 2002

Related U.S. Application Data

(63) Continuation of application No. 10/035,148, filed on Jan. 4, 2002.

(30) Foreign Application Priority Data

Jan. 4, 2001 (JP) .............................................. 2001-46

(51) Int. Cl.$^7$ ................................................ B41J 11/44
(52) U.S. Cl. .............................. 400/76; 400/61; 400/70
(58) Field of Search ................................ 400/76, 70, 61

(56) References Cited

U.S. PATENT DOCUMENTS 6,069,636 A * 5/2000 Sayuda et al. .............. 345/619

FOREIGN PATENT DOCUMENTS

| JP | 5-250113 | | 9/1993 | | |
| JP | 08138066 A1 | * | 5/1996 | ............. | B41J/2/485 |
| JP | 10083266 A1 | * | 3/1998 | ............. | B41J/29/46 |
| JP | 10124275 A1 | * | 5/1998 | ............. | B41J/2/485 |
| JP | 11017961 A1 | * | 1/1999 | ............. | H04N/9/73 |
| JP | 2000033730 A1 | * | 2/2000 | ............. | B41J/2/44 |

* cited by examiner

*Primary Examiner*—Charles H. Nolan, Jr.
(74) *Attorney, Agent, or Firm*—Antonelli, Terry, Stout & Kraus, LLP

(57) ABSTRACT

An image processing system includes a printer driver converting input image data into a printing data, and a printer apparatus performing data output using the converted image data. The printer driver or the printer apparatus includes at least an image forming apparatus. The image forming apparatus includes a data buffer storing an input printing data, a judgment portion for making judgment whether a define statement of a predetermined character is included in data stored in the data buffer; and a line screen value converting portion for converting a line screen definition for performing halftone printing of the predetermined character when a define statement of the predetermined character is contained in data stored in the data buffer.

3 Claims, 8 Drawing Sheets

HARFTONE CELL

2×2

GRADATION LEVEL NUMBER

4

LINE SCREEN

10lpi

RESOLUTION

20dpi 1 inch

HARFTONE CELL

1×1

GRADATION LEVEL NUMBER

2

LINE SCREEN

20lpi

RESOLUTION

20dpi

IMAGE PROCESSING SYSTEM HAVING IMAGE FORMING APPARATUS AND PRINTER APPARATUS

This application is a Continuation application of Ser. No. 10/035,148, filed Jan. 4, 2002, which is hereby incorporated by reference.

BACKGROUND OF THE INVENTION

The present invention relates in general to an image forming apparatus in which degradation of the visibility of printing is reduced or eliminated when printing on paper. More particularly, the invention relates to an image forming apparatus that is useful for monochromatic printing of a color image or a gray scale image.

Japanese Patent Application Laid-Open No. Heisei 5 (1993)-250113 discloses a technique for obtaining a conspicuous monochrome image during monochrome printing of an image, in which color image data and code data are mixedly present, by outlining in an image around a portion where image data and code data overlap.

However, when the area around the portion in an image where the image data and the code data overlap is outlined, a gap relative to an original image becomes large so as to produce an unnatural image.

SUMMARY OF THE INVENTION

It is therefore an object of the present invention to obtain a natural image with good visibility during printing.

According to a first aspect of the present invention, an image forming apparatus comprises: a data buffer storing input print data; a judgment portion for making a judgment as to whether a defined statement of a predetermined character is included in data stored in the data buffer; and a line screen value converting portion for converting a line screen definition for performing halftone printing of a predetermined character when a defined statement of the predetermined character is contained in data stored in the data buffer.

In the preferred construction, the line screen value converting portion may comprise: a first information input terminal for receiving an input of a value of line screen to be converted; a second information input terminal for receiving an input designating a font size to be a conversion object; a font size comparing portion, that is active when there is a description of the font size in the data in the data buffer, for comparing the font size with a font size received via the second information input terminal; a line screen conversion character string storage portion for storing an additional character string for performing line screen conversion; and a selector for switching an output between input print data and the line screen conversion character string on the basis of a result of judgment in the character string judgment portion and a result of comparison in the font size comparing portion.

The line screen value converting portion may comprise: a background color information extracting portion for extracting information of a background color from the print data; and a line screen value determining portion for determining a line screen value for conversion while taking the extracted background color into account.

According to a second aspect of the present invention an image forming apparatus comprises: a data buffer storing input print data; a character string judgment portion for making a judgment as to whether a defined statement of a predetermined character is present in data stored in the data buffer; and a color information converting portion for converting a color definition of the character to be printed.

In the preferred construction, the color information converting portion may comprise: a color judgment portion for extracting color information from the data in the data buffer and for making a judgment as to whether degradation of visibility can be caused upon gray scale conversion; a color conversion character string storing portion for storing a character string to perform color conversion; and a selector for switching an output between the input print data and the character string with a converted color definition on the basis of a result of judgment in the character string judgment portion and a result of comparison in the font size comparing portion.

The color information converting portion may comprise: a background color information extracting portion for extracting information of the background color from the print data; and a color information determining portion for determining color information to be converted on the basis of extracted background color information.

According to a third aspect of the present invention, an image forming apparatus comprises: a data buffer temporarily storing print data input through an input terminal; a print data converting portion, that is active when the description of a character is contained in data temporarily stored in the data buffer, for converting the print data for enhancing the visibility of the character; an output terminal for externally outputting the print data after conversion; and a process end signal output terminal for externally outputting a signal when the end of the print data is detected by a data end judgment portion.

The print data converting portion may comprise: a first information input terminal for receiving an input of a value of line screen to be converted; a second information input terminal for receiving an input designating a font size to be conversion object; a font size comparing portion that is active when there is a description of the font size in the data in the data buffer, for comparing the font size with a font size received via the second information input terminal; a line screen conversion character string storage portion for storing an additional character string for performing line screen conversion; and a selector for switching an output between input print data and the line screen conversion character string on the basis of a result of judgment in the character string judgment portion and a result of comparison in the font size comparing portion.

In such a case, the line screen value converting portion may comprise: a background color information extracting portion for extracting information of a background color from the print data; and a line screen value determining portion for determining a line screen value for conversion while taking the extracted background color into account.

In the alternative, the print data converting portion may comprise: a color judgment portion for extracting color information in the data in the data buffer and making a judgment as to whether degradation of the visibility can be caused upon gray scale conversion; a color conversion character string storing portion for storing the character string to perform color conversion; and a selector for switching an output between the input print data and the character string with a converted color definition on the basis of a result of judgment in the character string judgment portion and a result of comparison in the font size comparing portion.

The color information converting portion may comprise: a background color information extracting portion for extracting information of the background color from the print data; and a color information determining portion for determining color information to be converted on the basis of extracted background color information.

According to a fourth aspect of the present invention, an image processing system comprises: a printer driver for converting input image data into print data; and a printer apparatus for performing data output using the converted image data, the printer driver including at least the image forming apparatus set forth above.

According to a fifth aspect of the present invention, an image processing system comprises: a printer driver for converting input image data into print data; and a printer apparatus for performing data output using the converted image data, the printer apparatus including at least the image forming apparatus as set forth above.

According to a sixth aspect of the present invention, an image forming method may comprise the steps of: parsing information of input print data; converting the print data based on the parsing; and outputting data on the basis of a print data process through the conversion process.

BRIEF DESCRIPTION OF THE DRAWINGS

The present invention will be understood more fully from the detailed description given hereinafter and from the accompanying drawings of the preferred embodiments of the present invention, which, however, should not be taken to be limitative of the invention, but are presented for explanation and understanding only.

In the drawings.

DESCRIPTION OF THE PREFERRED EMBODIMENT

Figure 1:
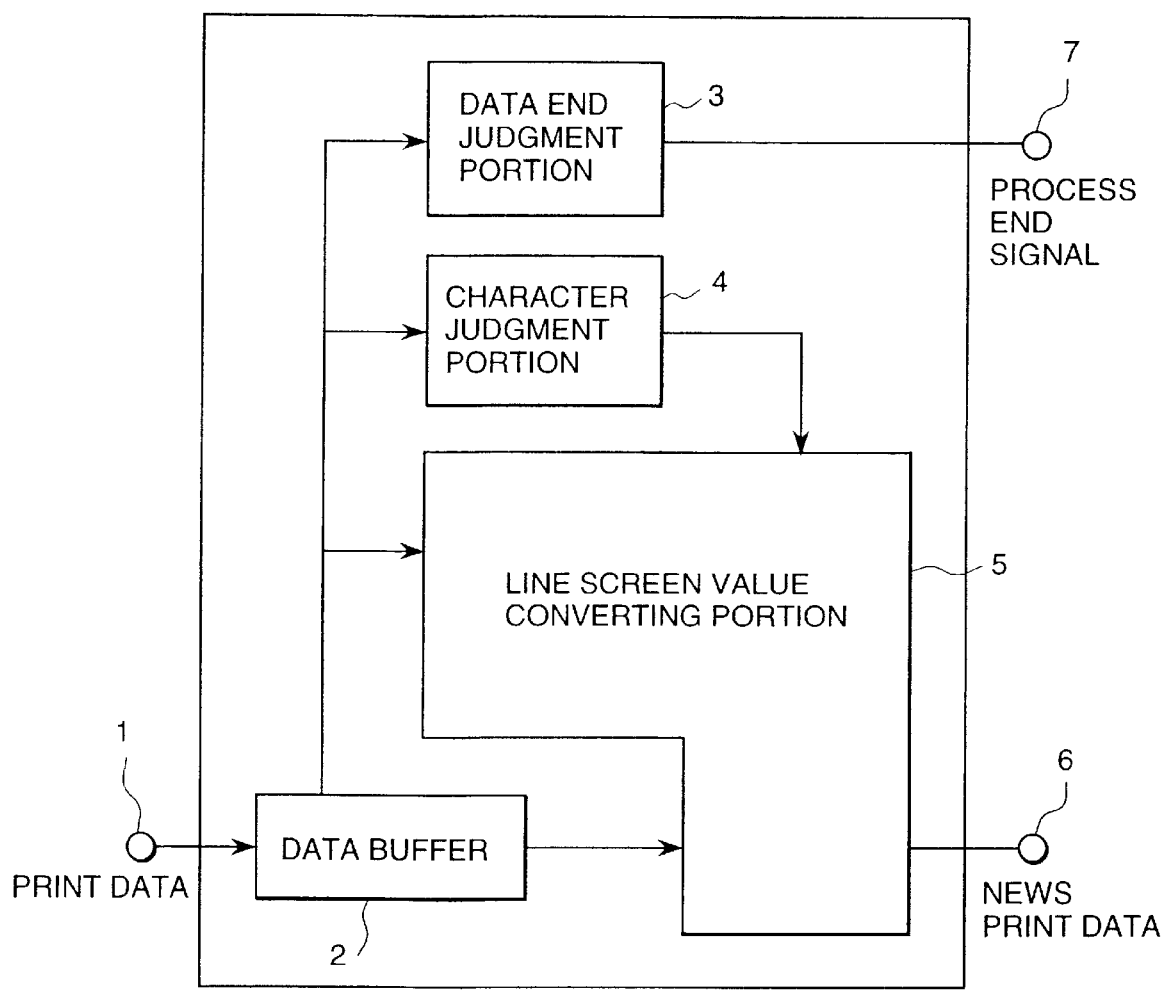
FIG. 1 is a block diagram showing the construction of the first embodiment of an image forming apparatus according to the present invention.

The present invention will be discussed hereinafter in detail in terms of various preferred embodiments of an image forming apparatus and image processing system according to the present invention with reference to the accompanying drawings. In the following description, numerous specific details are set forth in order to provide a thorough understanding of the present invention. However, it will be obvious to those skilled in the art that the present invention may be practiced without these specific details. In other instances, well-known structures are not shown in detail in order to avoid unnecessary obscurity in the description and illustration of the present invention.

Upon outputting data containing color information from a monochrome printer, a conversion process for converting the color information into gray scale information is performed. Particularly, among color information for each pixel, brightness information is extracted to convert the pixel information into a gray scale level between white~gray~black on the basis of the extracted brightness information. Upon practically outputting a gray scale image from the monochrome printer, the gray scale level has to be expressed by a binary value of white and black. For this reason, a halftone dot referred to as a halftone cell is employed to realize a pseudo gray scale expression. For example, when the size of one halftone cell is a sixteen dot square, and when the output resolution of the printing output is 2400 dpi, a hundred-fifty halftone cells are aligned in one inch. Hereinafter, the number of halftone cells will be referred to as a line screen which represents a number of lines of dots appearing per linear inch. Once the line screen and resolution are determined, the size of the halftone cell is determined. On the other hand, depending upon the size of the halftone cell, the capability of the gradation expression is determined. A ratio of white dots to black dots in the halftone cell, that expresses the gray scale level of the halftone dot, determines the number of gradation levels in gray scale expression to be expressed by the halftone cell. For example, when the size of one halftone cell is constructed by sixteen dots square, two-hundred and fifty-six gradation levels can be expressed. In general, a relationship of Number of gradation levels=(resolution $(dpi)$)/(line screen $(lpi)$)$^2$ is established. Due to the foregoing relationship between the line screen, the resolution and the number of gradation levels, a smaller value of line screen achieves a greater number of gradation levels to be expressed. A monochrome expression to be expressed through the foregoing conversion process for an original color image can be converted into an expression which results in degradation of the visibility in some objective original images. The present invention has been worked out for solving this problem.

On the other hand, in general, when image data, such as a photographic image, is to be printed, a greater number of gradation levels will achieve a higher ability of the gray scale to achieve a more natural feeling. On the other hand, for print data containing monotone data, such as a character, a greater line screen increases the clarity of expression in a detailed portion, such as edge or the like, so as to be more conspicuous. However, upon practical printing with a printer, the resolution and the line screen are constant at a fixed value in the image data of the print object. Therefore, the number of gradation levels naturally becomes a constant. When the line screen is set to a small value for the purpose of producing a higher preference for the image data, the visibility of the color character data, particularly for a small character, is sacrificed. Conversely, when the line screen is set to a large value for the purpose of producing a higher preference for the character data, the number of gradation levels of the image expression is reduced so as to make the printed image expressionlessly crushed as a whole. The present invention has been developed for presenting a solution for the problems set forth above.

On the other hand, it should be noted that the object of the present invention should not be limited to a monochrome printer, but the invention is also applicable for a color printer output for providing a solution for the problem of degradation of visibility caused by coloration of the background color and graphic pattern and/or character. The present invention has been developed while focusing on the drawbacks set forth above and, thus, is characterized by provision of means for optimally setting the printing characteristics for objective image data and character data by converting only portions possibly causing degradation of visibility, while inserting a predetermined setting character string in the print data. Hereinafter, various preferred embodiments of the present invention will be discussed.

(First Embodiment)

FIG. 1 is a schematic block diagram of a first embodiment of an image forming apparatus according to the present invention, which can perform resolution conversion. This embodiment of the image forming apparatus generally comprises the following components 1 to 7. The reference numeral 1 denotes an input terminal through which print data is to be input. In this embodiment, postscript data described in a printer description language is provided as input objective data. The reference numeral 2 denotes a data buffer which accumulates input print data per one line. The data buffer stores the input data by shifting per one line. The reference numeral 3 denotes a data end judgment portion for making a judgment as to whether the data in the data buffer 2 is the end data among data stored in the data buffer 2. Namely, the data end judgment portion 3 typically detects the end of stored data by detecting "EOF" indicative of the end of the file. The reference numeral 4 denotes a character judgment portion which makes a judgment as to whether the stored data includes a defined statement of a particular character. The reference numeral 5 denotes a line screen value converting portion for converting a line screen definition for converting a character into halftone data to be printed when a description of the character is contained in the stored data in the data buffer 2. The reference numeral 6 denotes an output terminal for externally outputting the print data after performing line screen conversion. The reference numeral 7 denotes a process end signal output terminal for externally outputting a signal upon detection of the end of a line by the data end judgment portion 3.

Figure 2:
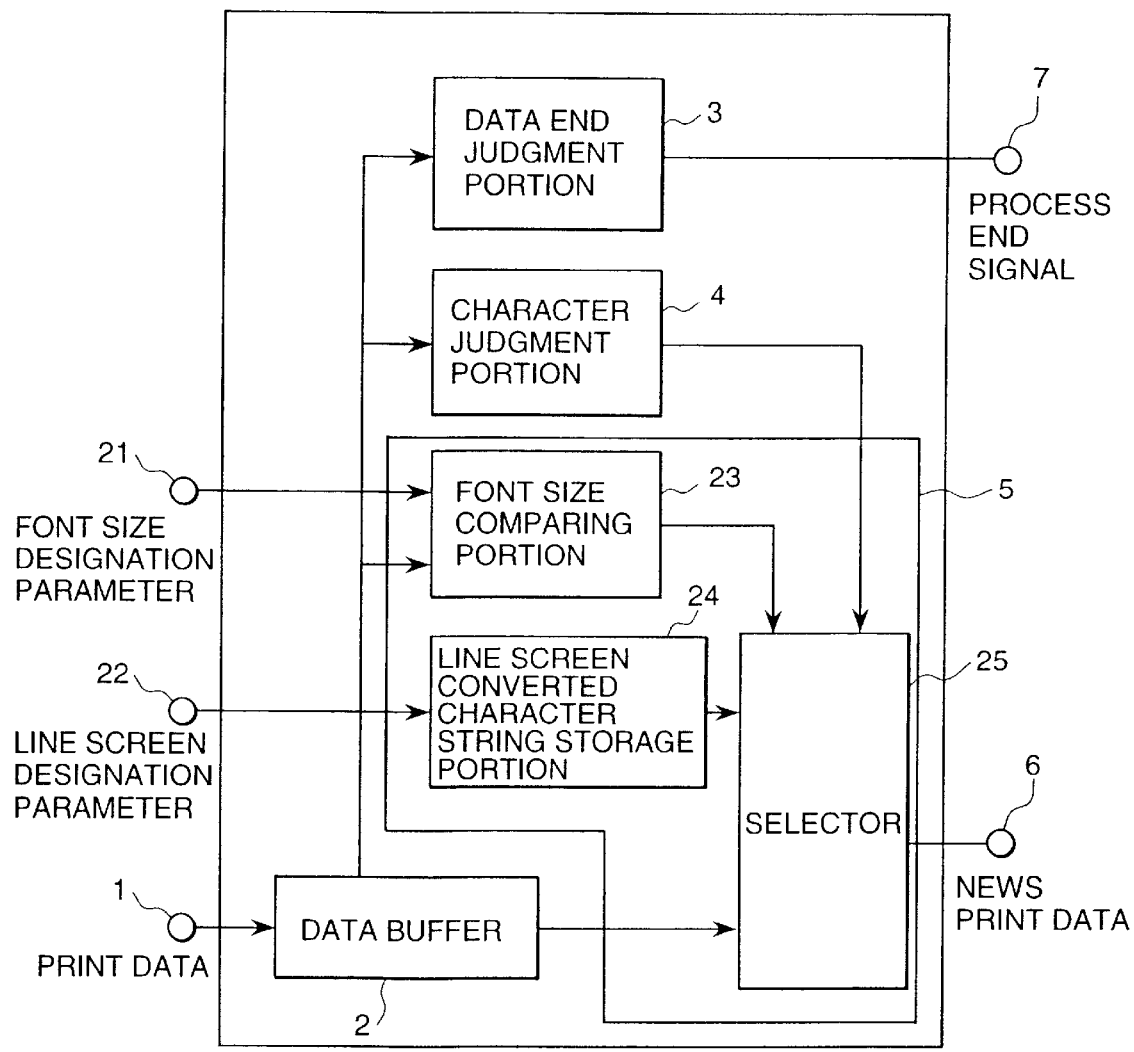
FIG. 2 is a block diagram showing a construction of a line screen converting portion in the first embodiment of the image forming apparatus according to the present invention.

FIG. 2 shows a particular embodiment of the line screen value converting portion 5. The reference numeral 22 denotes an information input terminal for inputting a value of line screen to be converted. The reference numeral 21 denotes an information input terminal for receiving data designating a font size to be used for conversion. The reference numeral 23 denotes a font size comparing portion for comparing the font size given from the information input terminal 21. The reference numeral 24 denotes a line screen conversion character string storage portion for storing an additional character string for performing line screen conversion. The reference numeral 25 denotes a selector for selectively switching either the input data from data buffer 2 or the line screen conversion character string in storage portion 24 to the output terminal 6 on the basis of the results outputted by the character string judgment portion 4 and the font size comparing portion 23.

The first embodiment of the image forming apparatus takes the print data as an input. The image forming apparatus for improving the visibility of a print data output by parsing information of the print data, comprises the input terminal for inputting the print data, the data buffer 2 for accumulating the print data per one line, the data end judgment portion 3 for making a judgment as to whether the data in the data buffer includes the end of the print data, the character judgment portion 4 for making a judgment as to whether a defined statement of the predetermined character is contained in data in the data buffer 2, the line screen value converting a portion 5 for converting line screen definition for converting the character to be printed into halftone data, the output terminal 6 for externally outputting the print data after conversion, and the process end signal output terminal 7 for externally outputting a signal upon detection of the end of the file by the data end judgment portion 3. The line screen value converting portion 5 comprises the first information input terminal 22 for inputting the value of the line screen to be converted, the second information input terminal 21 for designating the font size to be used for the conversion object, the font size comparing portion 23 for comparing the font size with the font size given from the information input terminal, the line screen conversion character string storage portion 24 for storing an additional character string for performing line screen conversion, and the selector 25 for selectively switching between the input printing data and the output of the line screen converting character string to output data depending upon a result of judgment in the character string judgment portion 4 and a result of comparison in the font size comparing portion 23.

FIG. 3 shows an example of the construction of an image processing system to be employed in the image forming apparatus according to the present invention.

Figure 3A:
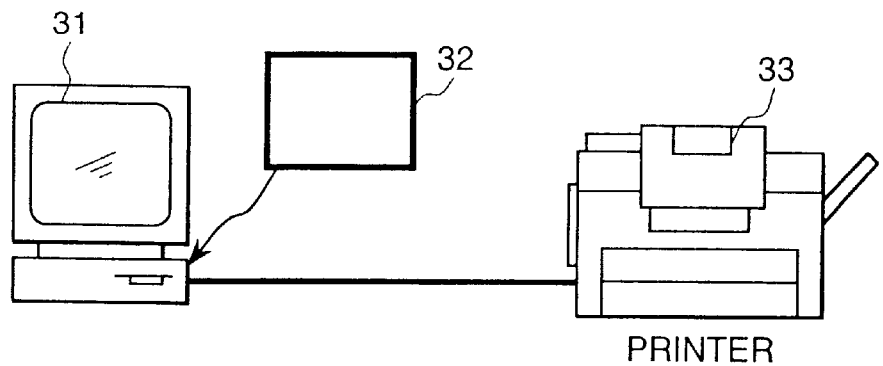
FIGS. 3(a), 3(b) and 3(c) are diagrams showing examples of system construction of an image processing system to be employed in the image forming apparatus according to the present invention.
Figure 3B:
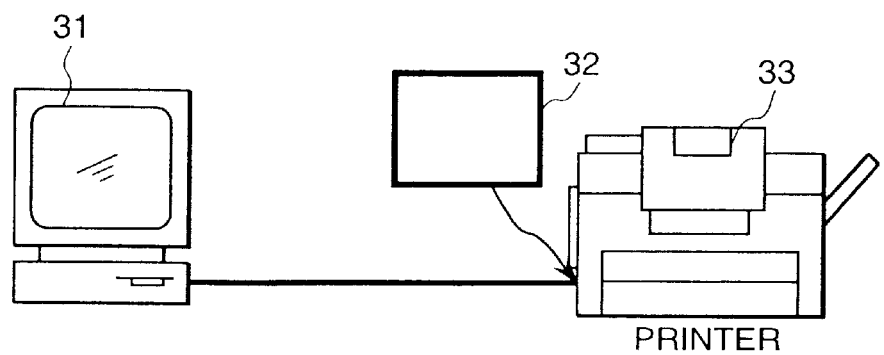
Figure 3C:
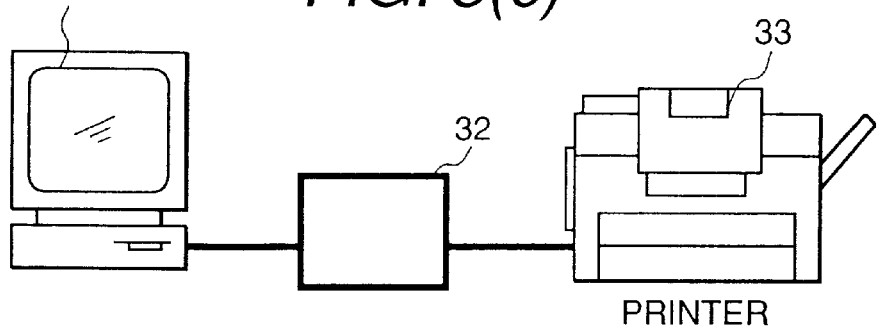

In FIGS. 3(a), 3(b) and 3(c), the reference numeral 31 denotes the image processing system typically represented by a personal computer. It is not required that the image processing system be a personal computer, since it can be an arithmetic processor, data accumulator or the like, having a terminal for outputting print data. The reference numeral 32 denotes the image forming apparatus shown in FIG. 1. The reference numeral 33 denotes the image output device, such as a printer, for producing a data image on paper on the basis of received print data. In the embodiment, the image processing system 31 is desirably a monochrome output postscript printer which can parse and print the printer description language post script language.

In FIG. 3(a), the image forming apparatus 32 is incorporated in the image processing system 31 for operation. In FIG. 3(b), the image forming apparatus is incorporated in the image output device 33. In FIG. 3(c), the image forming apparatus 32 is not incorporated neither in the image processing system 31 or in the image output device 33, but is located therebetween to permit independent operation. The image processing systems shown in FIGS. 3(a) to 3(c) are used as a printing system, for example.

It should be noted that the function of the image forming apparatus 32 may be realized by hardware or by software. Accordingly, the function of the image forming apparatus may be realized by software in the form of a program to be executed on the image processing system 31 or the image output device 33.

Figure 4:
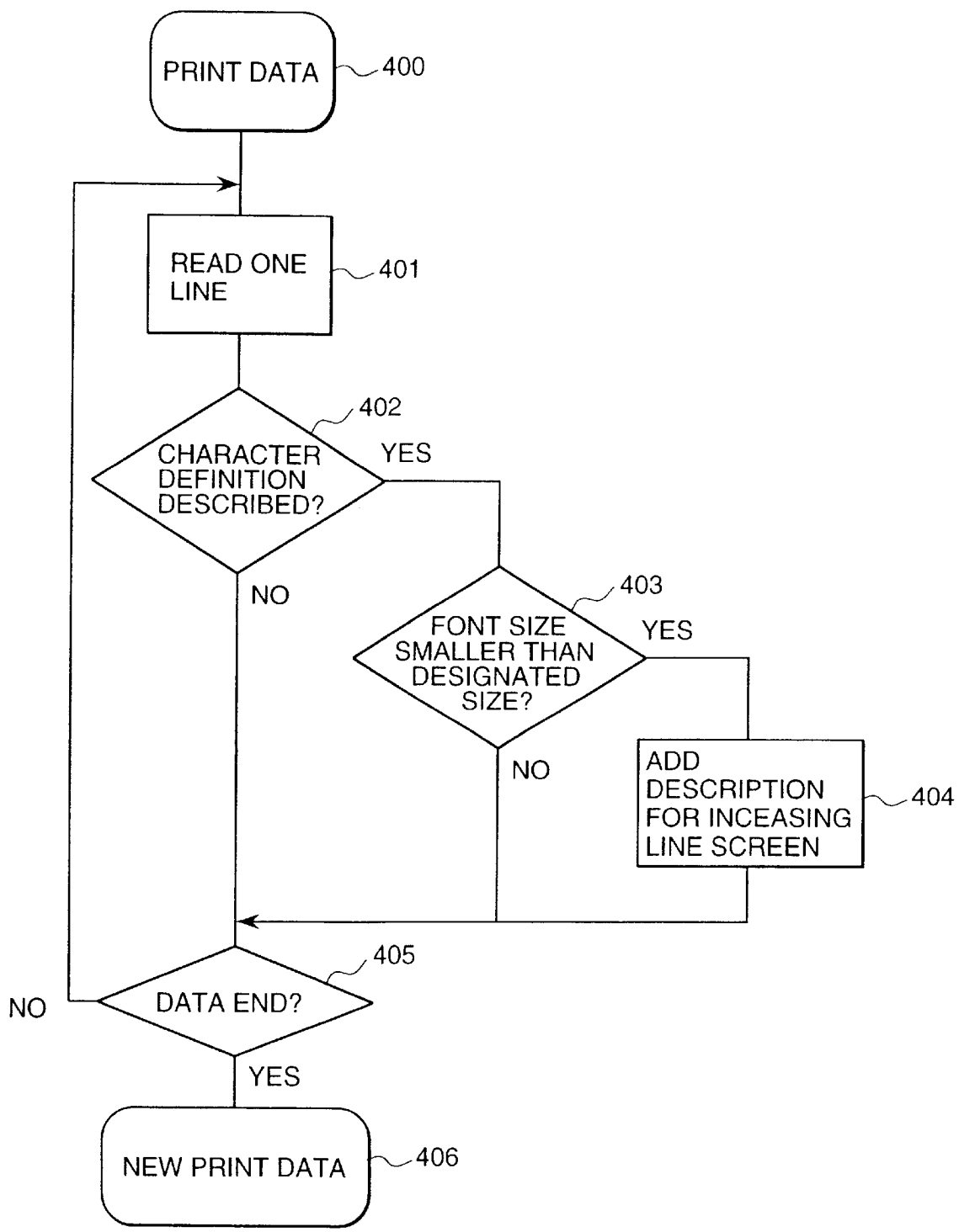
FIG. 4 is a process flowchart showing the process in accordance with the present invention.

FIG. 4 is a process flowchart of the process according to the present invention. It should be noted that the illustrated embodiment is premised on the use of postscript data as the input data, although the present invention is applicable for printing other types of print data.

At first, print data 400 obtained from the input terminal 1 of FIG. 1 is stored in the data buffer 2 per one line (step 401). In the character judgment portion 4, a judgment is made as to whether the printing object contains a character string as the character data (step 402). The print data in postscript description will frequently differentiate the definition of a character string per application. When a defined statement of the character string indicative of the character data is "MF", and when this character string is expressed in one line of the character data, it indicates that character information, such as font size, font kind and so forth, is described in the line. Therefore, the character judgment portion 4 may be set for detecting this character string "MF". When the character string is detected (YES in step 402), a judgment is made that the printing object is the character data to extract the font size of the character to print from the relevant line in the font size comparing portion 23. The position of the description of the font size is fixed by the software as a source of generation of the character data, and thus it can be easily extracted.

For example, in the illustrated embodiment, when the font definition character string in the print data is [300 0 0 −300 0 0]/AATT11E17C23A8-0 MF, it is premised that the numerical value "300" is a value determining the font size, and the character string "/AATT11E17C23A8-0" indicates the kind of font.

A comparison is made between the extracted font size and the font size input from the information input terminal 21 (step 403). When the font size of the character to be printed is smaller (YES in step 403), a command is output to the selector for outputting the character string in the line screen conversion character string storage portion 24. In practice, a description to increase the line screen is added (step 404). In the selector 25, the data in the data buffer 2 is normally output. However, when a judgment is made in the character judgment portion 4 and the font size comparing portion 23 that the line screen conversion character string is to be output, outputting of data from the data buffer 2 is temporarily stopped so as to switch the data path for outputting the character string in the line screen conversion character string storage portion 24. As a result, data produced by inserting the line screen conversion character string into the input print data can be output from the output terminal 6.

When the operation is repeated per one line of the input data and when the character string indicative of the end of data is detected in the data buffer 2 in the data end judgment portion 3 (YES in step 405), the process goes END to externally output a signal indicative of the end of the process from the output terminal 7. In response to this, new print data 406 is prepared. As an alternative method of data end judgment other than that which involves detecting the character string indicative of the end of data, as set forth above, it is possible to make a judgment of the presence of a data end when the data amount of the input data reaches a predetermined amount. As a further alternative, it is possible to make a judgment when a predetermined period has elapsed after data input. In short, any method which may detect a possible data end may be used.

The character string in the line screen conversion character string storage portion 24 may be formed in accordance with the description of the postscript. The following is one example of the character string:
/freq X def
/HProc {dup mul exch dup mul add I exch sub} def
freq 45/HProc load setscreen
In the character string, X is a line screen value to be converted and is replaced with a line screen designation parameter obtained from the information. A greater value of X may improve the visibility of the character.

Figure 6A:
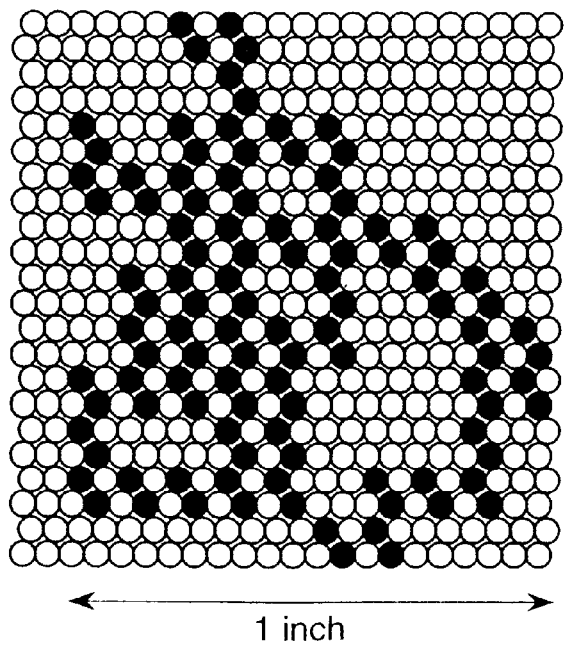
FIGS. 6(a) and 6(b) are diagrams showing an effect obtained by increasing the line screen in the present invention.
Figure 6B:
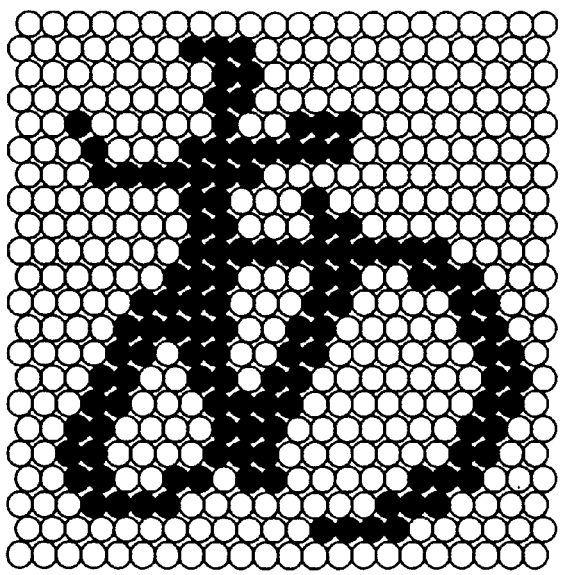

FIGS. 6(a) and 6(b) are diagrams showing the effect of improvement of visibility by increasing the line screen. In FIGS. 6(a) and 6(b), each circle represents a dot to be printed. When an area of one inch in length is assumed, as shown in FIGS. 6(a) and 6(b), the resolution of the figure becomes 20 dpi. FIG. 6(a) shows the character expressed by a halftone cell of 2×2 dots. In this case, the gradation level is 4, and the line screen is 10 lpi. On the other hand, in FIG. 6(b), the halftone cell is formed by a single dot. Therefore, the gradation level is 2 and the line screen is 20 lpi. If the original character is colored, the gradation expression of the character is done by halftone expression. In these Figures, an example of the expression of gradation is illustrated by making two dots in the four dot halftone cell in FIG. 6(a). On the other hand, in the example of FIG. 6(b), since only two tone expression is possible, the cells located in the character portion are expressed by black irrespective of the original color. From a comparison of FIGS. 6(a) and 6(b), it should be clear that the visibility of FIG. 6(b) having a greater line screen is much higher than that of FIG. 6(a).

(Second Embodiment)

Figure 7:
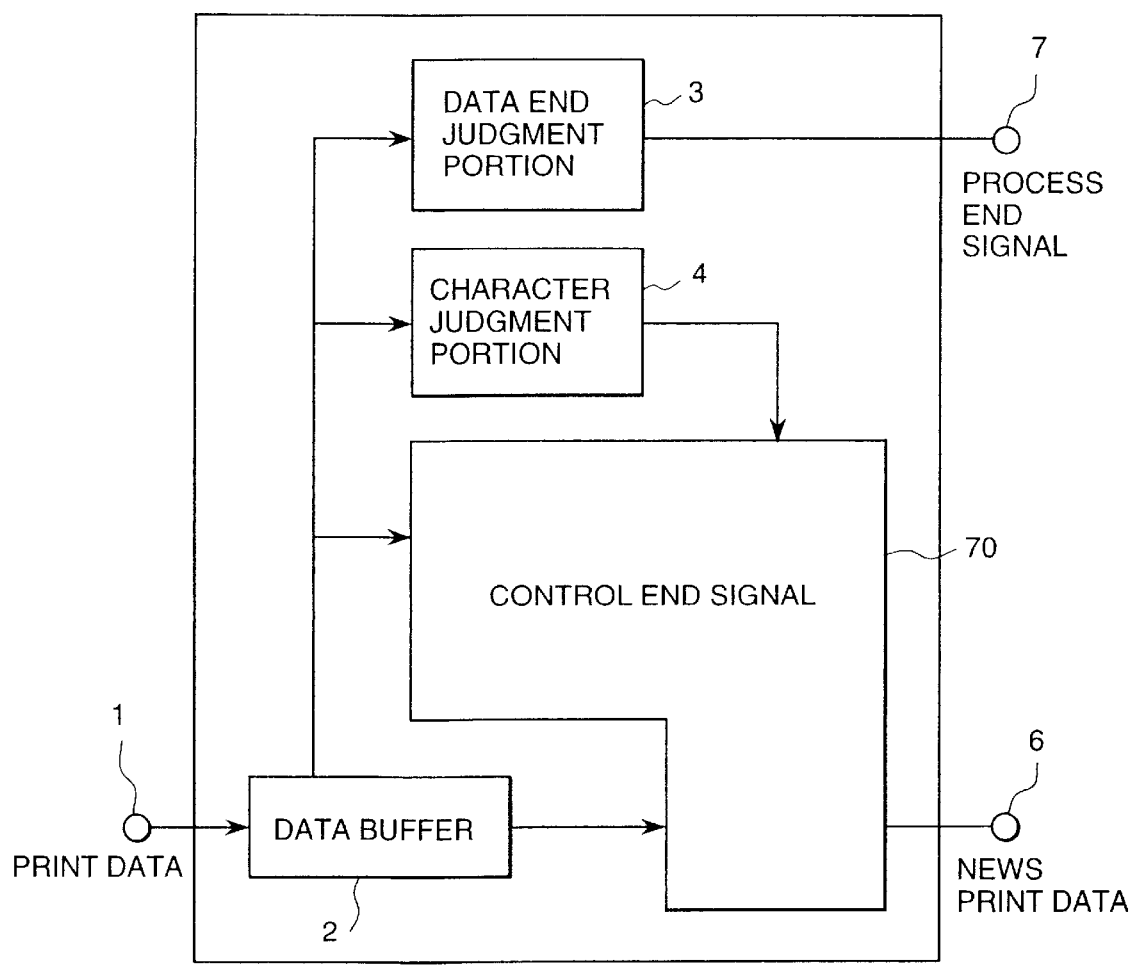
FIG. 7 is a block diagram showing the construction of a color information converting portion in the second embodiment of the image forming apparatus according to the present invention.

FIG. 7 is a schematic block diagram showing the construction of a second embodiment of the image forming apparatus for performing resolution conversion according to the present invention. This embodiment of the image forming apparatus is constructed with the following components identified by the reference numerals 1 to 7 and 70. The components identified by the reference numerals 1 to 7 are the same as those discussed in connection with the first embodiment. The reference numeral 70 denotes a color information converting portion converting color definition for printing a character when data in the data buffer 2 contains a description of the character.

Figure 5:
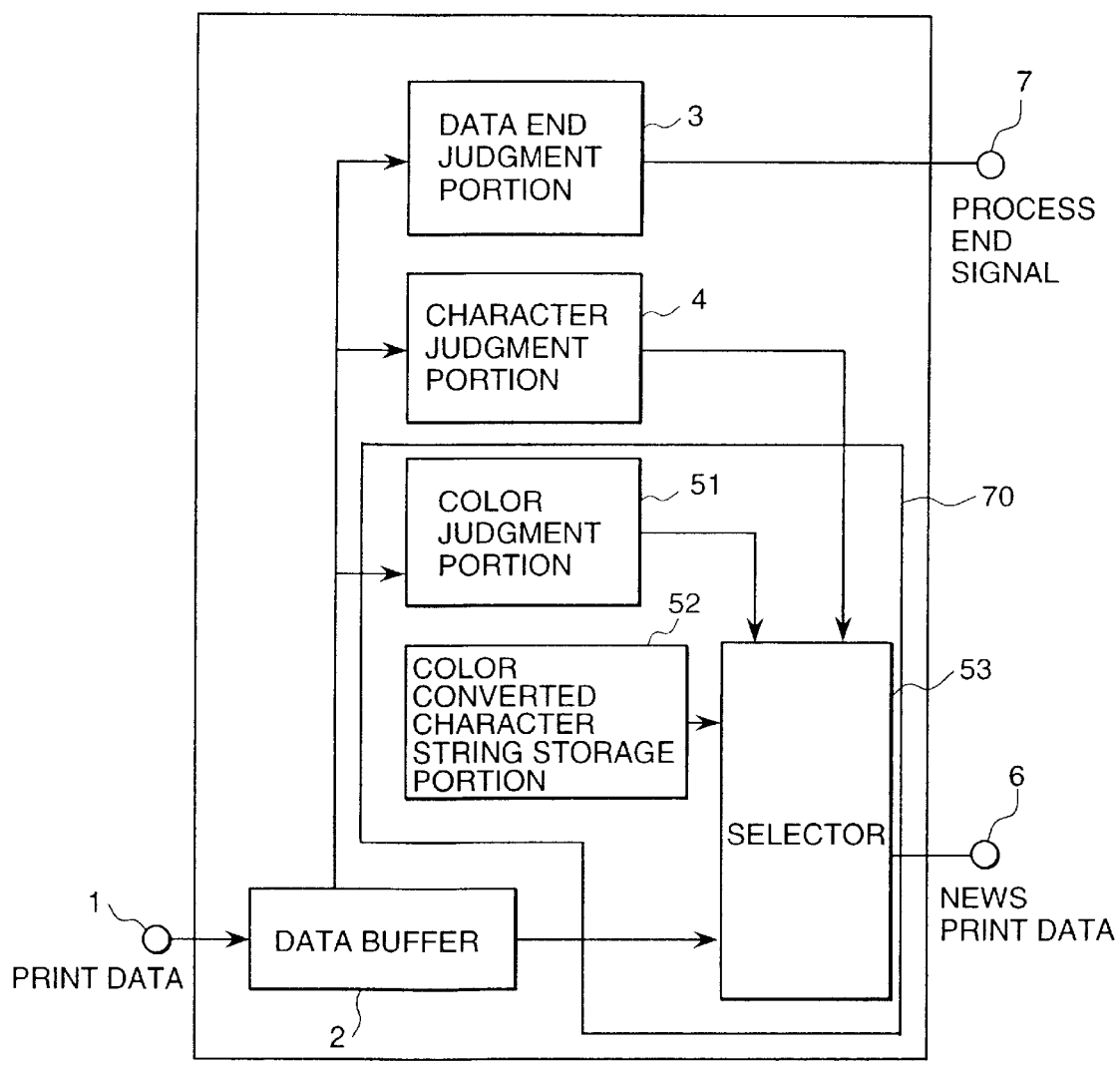
FIG. 5 is a block diagram showing the construction of a second embodiment of an image forming apparatus according to the present invention.

FIG. 5 shows an alternative embodiment of the particular example for is realizing the color information converting portion 70. The reference numeral 51 denotes a color judgment portion for extracting color information from the data stored in the data buffer 4 and for making a judgment as to whether degradation of the visibility can be caused upon conversion into a gray scale image. The reference numeral 52 denotes a color conversion character string storage portion for storing a character string to perform color conversion. The reference numeral 53 denotes a selector for switching the output between the input print data and the color conversion character string depending upon a result of judgment in the character string judgment portion 4 and a result of comparison in the font size comparing portion 23. The system construction is similar to FIG. 3.

At first, the print data obtained from the input terminal 1 of FIG. 1 is temporarily stored in the data buffer 2 per one line. In the character string judgment portion 4, a judgment is made as to whether a character string indicative of the character data is contained in the printing object or not. When the character string is detected and judgment is made that the printing object is the character data, color information of the character is extracted in the color judgment portion 51. If a judgment is made that the color of the character is light as converted into gray scale, a command is output to the selector so that the character string in the color conversion character string storage portion 52 is output. In the selector 53, data in the data buffer 2 is normally output. However, when judgment is made that outputting of the color conversion character string is necessary, in the character judgment portion 4 and the color judgment portion 51, the selector is switched for interrupting outputting of the data in the data buffer 2, as is done in a normal state, and outputting of the character string in the color conversion character string storage portion 52 is selected. As a result, from the output terminal 6, the color information from the input print data can be converted into color information having a high visibility. When the operation is repeated per one line of the input data and when the character string indicative of the end of data is detected in the data buffer 2 by the data end judgment portion 3, the process goes to END to externally output a signal indicative of the end of the process from the output terminal 7.

The character string in the color conversion character string storage portion 24 can improve the visibility of the character by describing how to make the character to be expressed in black, uniformly.

(Third Embodiment)

Figure 8:
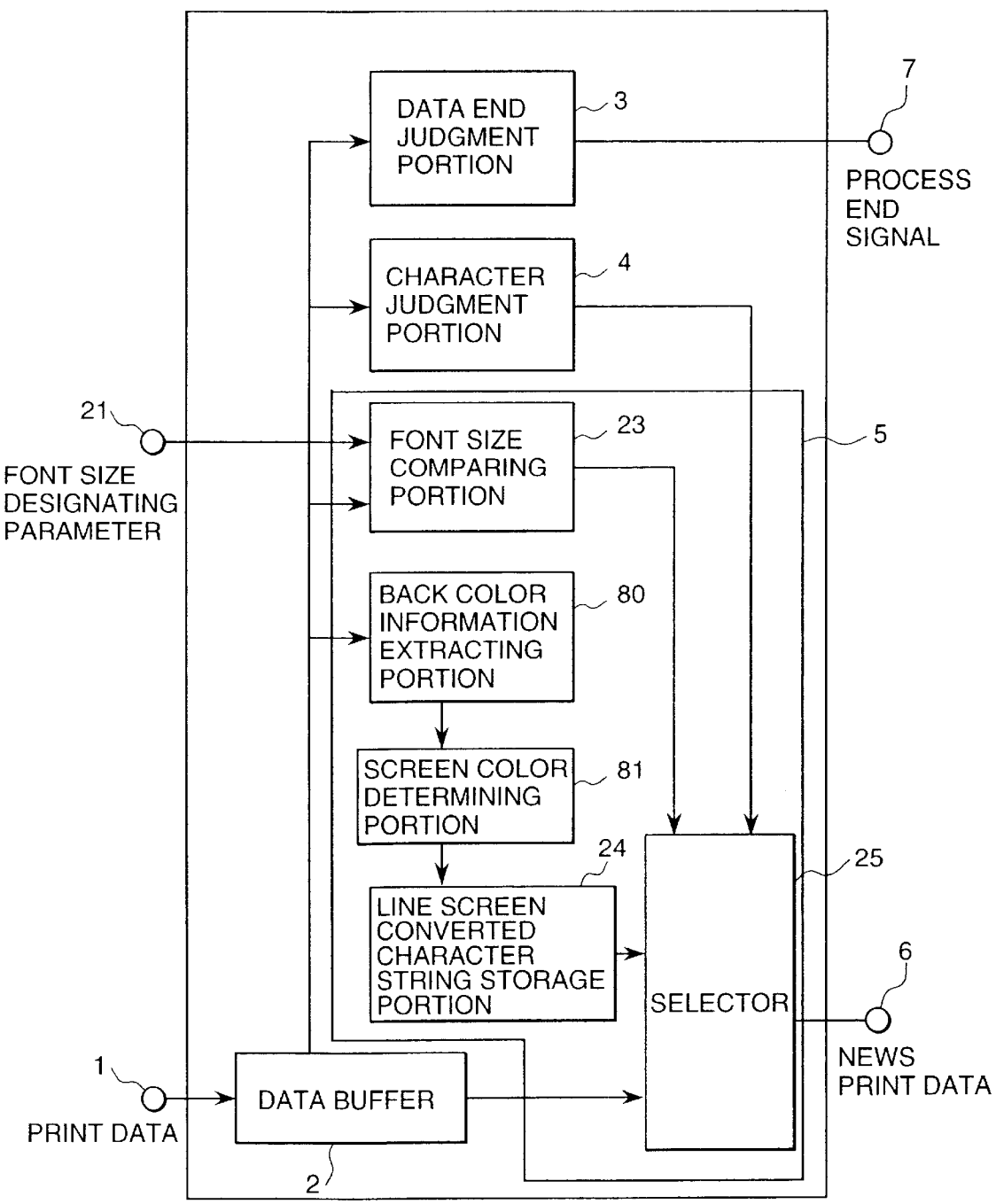
FIG. 8 is a block diagram showing the construction of a third embodiment of an image forming apparatus according to the present invention.

In accordance with the present invention, in this preferred embodiment, line screen value conversion and/or color conversion may be performed while taking the background color of the original into consideration. FIG. 8 is a schematic block diagram showing a third embodiment of the image forming apparatus according to the present invention, in which printing is permitted in consideration of the background color of the original.

In FIG. 8, the components identified by the reference numerals 1 to 7, 21 and 23 to 25 are similar to those discussed in connection with the first embodiment. The reference numeral 80 denotes a background color information extracting portion for extracting background color information in the printing data description stored in the data buffer. The reference numeral 81 denotes a line screen value determining portion for determining a line screen for effecting conversion in consideration of the extracted background color. While the second embodiment determines the line screen value derived by an external input, this third embodiment determines the line screen value in consideration of the background color of the print data in the background color information extracting portion 80 and the line screen value determining portion 81. Other operations are the same as those in the first embodiment. Also, this third embodiment may be modified by adding a similar function to the color information converting portion 70n in the second embodiment, so that color information to be converted can be determined.

As set forth above, in the preferred embodiments of the present invention, by inserting a setting character string in an arbitrary portion in the print data, means for setting the optical printing characteristics for the objective image data and the character data can be provided. Namely, an image forming apparatus receiving print data and having an improved visibility in the printed output using parsing information of the print data, includes the input terminal receiving the print data as an input, the data buffer storing the print data per one line, the data end judgment portion for making a judgment as to whether the data in the data buffer is end data in the print data, the character string judgment portion for making a judgment as to whether a defined statement of the predetermined character is present in the data in the data buffer, the print data converting portion for converting the print data for improving visibility of the character when the description of the character is contained in the data buffer, the output terminal for externally outputting the print data after conversion, and the process end signal output terminal for externally outputting the signal when end of file is detected by the data end judgment portion. By adding or converting the character string for improving the visibility of the character font to be smaller than or equal to a designated character size, the expression of a detailed portion, such as an edge of the character image, can be made clear. As set forth above, by adding the character string for improving the visibility of the character font so as to be smaller than or equal to the character size, the expression of a detailed portion, such as an edge, of the character image can be made clear.

Although the present invention has been illustrated and described with respect to exemplary embodiments thereof, it should be understood by those skilled in the art that the foregoing and various other changes, omission and additions may be made therein and thereto, without departing from the spirit and scope of the present invention. Therefore, the present invention should not be understood as limited to the specific embodiments set out above, but clearly includes all possible embodiments which can be embodied within a scope encompassed and equivalent to the features set out in the appended claims.

For instance, while the embodiments have been discussed in terms of printing an output of a color original using a monochrome printer, the present invention should not be limited to this. Namely, the present invention is applicable to the case where the color original is output by a color printer.

What is claimed is:

1. An image processing system comprising:
   an image forming apparatus for converting input image data into a printing data; and
   a printer apparatus performing data output using the converted image data;
   wherein said image forming apparatus comprises:
   a data buffer storing an input printing data;
   a judgment portion for making judgment whether a define statement of a predetermined character is included in data stored in said data buffer; and
   a line screen value converting portion for converting a line screen definition for performing halftone printing of said predetermined character when a define statement of said predetermined character is contained in data stored in said data buffer.

2. An image processing system as set forth in claim 1, wherein said line screen value converting portion comprises:
   a first information input terminal for receiving input of a value of line screen to be converted;
   a second information input terminal receiving an input designating a font size to be conversion object;
   a font size comparing portion active when a description of the font size in the data in said data buffer, for comparing the font size with a font size given from said second information input terminal;
   a line screen conversion character string storage portion storing an additional character string performing line screen conversion; and
   a selector for switching output between input printing data and said line screen conversion character string on the basis of result of judgment in said character string judgment portion and comparison in said font size comparing portion.

3. An image processing system as set forth in claim 1, wherein said line screen value converting portion comprises:
   a background color information extracting portion for extracting information of a background color from the printing data; and
   a line screen value determining portion for determining a line screen value for conversion with taking the extracted background color into account.

* * * * *